United States Patent
Patel et al.

(10) Patent No.: US 8,075,938 B2
(45) Date of Patent: Dec. 13, 2011

(54) DRY PSYLLIUM HUSK INCORPORATED DOUGH PRODUCTS AND METHOD OF PREPARATION THEREOF

(75) Inventors: Shruti Hiten Patel, Vadodara (IN);
Hiten Ishwarbhai Patel, Vadodara (IN);
Kaushik Keshavlal Patel, Gujarat (IN)

(73) Assignees: Shruti Hiten Patel, Vadodara, Gujarat (IN); Hiten Ishwarbhai Patel, Vaddara, Gujarat (IN)

( * ) Notice: Subject to any disclaimer, the term of this patent is extended or adjusted under 35 U.S.C. 154(b) by 1341 days.

(21) Appl. No.: 11/551,511

(22) Filed: Oct. 20, 2006

(65) Prior Publication Data
US 2007/0264405 A1    Nov. 15, 2007

(30) Foreign Application Priority Data

Apr. 20, 2006 (IN) .......................... 617/MUM/2006

(51) Int. Cl.
*A21D 2/00* (2006.01)

(52) U.S. Cl. ........ 426/549; 426/496; 426/506; 426/507; 426/551; 426/573

(58) Field of Classification Search .................. None
See application file for complete search history.

(56) References Cited

U.S. PATENT DOCUMENTS 5,384,136 A * 1/1995 Lai et al. .......................... 426/19

* cited by examiner

*Primary Examiner* — Lien Tran
(74) *Attorney, Agent, or Firm* — Bobby W. Braxton; Kirk A. Voss; Carstens & Cahoon, LLP

(57) ABSTRACT

The present invention discloses dry psyllium husk incorporated dough products and method of preparation thereof. Up to 14% unpowdered psyllium husk-300 mesh sized psyllium husk powder (having 95% to 99.99% purity) of total amount flour is used for the preparation of dough products. Also 4.5 gm±20% water per 1 gm of psyllium is the right quantity of additional water to bind the dough having psyllium. The psyllium husk can be either whole, fragmented, slitted, normal, bleached, snow white or processed source of psyllium husk powder.

2 Claims, No Drawings

DRY PSYLLIUM HUSK INCORPORATED DOUGH PRODUCTS AND METHOD OF PREPARATION THEREOF

FIELD OF THE INVENTION

The present invention relates to dry psyllium husk incorporated dough products and method of preparation thereof.

In the present invention dry psyllium husk is used in the preparation of the dough products. The process for preparation of dough products is simple, less time consuming and cost-effective.

BACKGROUND OF THE INVENTION

Extensive research has been carried out into the physiological effects of dietary fiber and there is evidence that a low intake may be associated with a number of diseases. Inverse relationships between fiber intake and the incidence of obesity, heart disease, cholesterol, cancers (of the colon and breast), diabetes and gastrointestinal disorders have been reported. Dietary fiber may also bind toxins, bile acids and carcinogens [From: http://www.ifst.org/hottop33.htm—Institute of Food Science & Technology, UK]. Thus fiber content in the food plays an important role in the natural functioning of the body. The Nutrient Facts Panel for U.S. Food Regulations has determined that the target percentage daily value for dietary fiber is about 25 grams in a 2000 calorie per day diet and about 30 grams in a 2500 calorie per day diet.

Psyllium is one of the best source of natural dietary fiber. The source of psyllium is the seeds of plants of the *Plantago* genus. Various species such as *Plantago lanceolate, Plantago ruqelii*, and *Plantago major* are known. Commercial psyllium seed husk is typically obtained from the French (black; *Plantago indica*), Spanish (*Plantago psyllium*) or Indian (blonde; *Plantago ovata*) psyllium seeds, which grow in certain subtropical regions. Indian (blonde) psyllium husk is preferred for use herein. Since it is believed by those skilled in the art that the active ingredient of psyllium is the psyllium seed gum, which is located primarily in the seed husk, present technology uses the ground seed husk as the source of psyllium. However the whole seed is also known as a psyllium source, as well as the dehusked psyllium seed. Psyllium husk powder typically contains 70% Soluble Dietary Fibre (SDF) and 87% Total Dietary Fibre (TDF).

The specific use of a psyllium hydrophilic mucilloid to lower cholesterol in serum was documented by Anderson et al., Arch. Intern. Med. Vol. 148, February 1988, 292-296 (1988), Anderson et al., Am J. Clin Nutr. Vol. 56, p. 93-98, (July 1992).

Three to twelve grams of soluble fiber from psyllium, as part of a low fat diet, can reduce total cholesterol by about five percent and lower LDL cholesterol by about nine percent. (From: Psyllium-enriched cereals lower blood total cholesterol and LDL cholesterol: Results of a meta-analysis. J. Nutr. (1997) 127:1973-80.)

High-fiber foods, because of their consistency, encourage mastication and stimulate the secretion of digestive juices. The soluble components of dietary fiber cause an increase in the viscosity of the stomach contents, thereby retarding gastric emptying. This then affects the rate of digestion and the uptake of nutrients and creates a feeling of satiety. [From: http://www.ifst.org/hottop33.htm—Institute of Food Science & Technology, UK]. For these reasons, incorporating psyllium husk and other sources of fiber into the diet help in reducing obesity.

Soluble fiber in psyllium inhibits the digestion and absorption of carbohydrates thus lowering Glycemic Index which, causes slow release of sugar in the blood stream, thus tends to control diabetes. This also improves the efficiency of insulin in the cells and hence likely decrease the need for external insulin if the person is insulin dependent.

Psyllium's emollient, demulcent and laxative effects are helpful in treatment of constipation (by softening the stool thereby increasing speed and the passage of stool and absorbing water thereby producing more bulk), diarrhea (by soaking up a significant amount of water in the digestive track and thereby making stool firmer), irritable bowel syndrome (by regulating stool frequency and consistency), hemorrhoids (psyllium helps to soften the stool and reduce the pain associated with hemorrhoids). It is also useful in the treatment of amoebic and bacillary dysentery, inflammatory bowel disease, and colon cancer.

However, due to its mucilaginous nature, psyllium acquires a slimy or adhesive texture and mouthfeel upon hydration. Psyllium normally forms a gelatinous mass when contacted with water and exhibits poor dispersibility and mixability in water. Psyllium also develops a distinctive, undesirable flavor in the presence of heat and moisture which limits its use in food products. This slimy mouthfeel is unpalatable and, accordingly, various additives have been incorporated in psyllium-containing ingestible compositions in order to mask the undesirable texture and mouthfeel of the psyllium.

U.S. Pat. No. 5,126,150 discloses composition containing psyllium in which calcium lactate coated psyllium fiber, insoluble dietary fiber, shortening, flour, sugar and water are used in making baked cookies.

U.S. Pat. No. 5,384,136 discloses psyllium-enriched dough products and method for making the same. The dough product is prepared using gluten and contains prewetted psyllium from 1.0 to 5.0 grams per one ounce of dough product. U.S. Pat. No. 5,384,144 discloses psyllium-enriched pasta products and method for making same. The pasta product contains prewetted psyllium from 1.0 to 5.0 grams per two ounces of pasta product. The method of making the dough/pasta product comprises firstly formation of extruded psyllium pellets by using psyllium, sweetening agent and flour ingredient. Further grinding the extruded psyllium pellets to form a powder; prewetting said psyllium powder and forming its composition; finally blending the said psyllium composition with a dough base to form a dough product. Moreover process is also cumbersome and lengthy. Prewetting procedure requires constant observation otherwise it may cause growth of microorganisms.

U.S. Pat. No. 5,955,123 discloses baked compositions comprising psyllium husk from smooth textured METAMUCIL®. Herein more than 90% of psyllium used having particle size smaller than 45 mesh and wherein the psyllium husk is agglomerated with an agglomerating material selected from the group consisting of water dispersible hydrolyzed starch oligosaccharide, monosaccharide, disaccharide, polyglucose, polymaltose and mixtures thereof.

SUMMARY OF THE INVENTION

The techniques mentioned in the above stated inventions are either laborious, require special handling or required specially treated psyllium. They also mentioned that "neat" psyllium when combined with other ingredients or hydrated before the compositions are baked leads to an unpalatable product and hence cannot be incorporated into dough products. Also none of them explain the effects of purity and particle size of psyllium husk on dough products and the amount of additional water that would be required to properly bind dough having psyllium husk due to the mucilaginous nature of psyllium. So there is a requirement of technique, which is simple and effective.

In the present invention, psyllium husk having particular particle size, purity and colour is incorporated in the dough products, with specific amount of additional water, which gives better results.

DESCRIPTION OF THE PREFERRED EMBODIMENTS

The main object of the present invention is to prepare dry psyllium husk incorporated dough products and method of preparation thereof.

In the present invention the dough products included are but not limited to bread, muffin, pizza crust, pretzel, sweet roll, croissant, bagel, English muffin, cookie, pancake, biscuit, donut, piecrust, etc. wherein leavening agents are used and noodles, pastas, spaghetti, macaroni, Indian breads (roti, puri, paratha, tandoori naan, and khakhra, etc) etc. wherein leavening agents are not used.

In the present invention flour is selected from but not limited to wheat flour, whole wheat flour, rye flour, corn flours and sorghum flour, etc.

One or more leavening agents may also be included which may include yeast and non-yeast leavening agents, include a source of carbon dioxide such as sodium bicarbonate or potassium bicarbonate, alone or in combination with a leavening acid such as monocalcium phosphate, dicalcium phosphate, sodium acid pyrophosphate, sodium aluminum sulfate, sodium aluminum phosphate, potassium acid tartrate and the like.

Unless otherwise stated or indicated, the percentage of psyllium husk is expressed as a weight percent of the flour ingredient, amount of additional water is expressed per 1 gram of psyllium husk and weight of the ingredients are expressed in grams. Screen mesh sizes used in this invention are based on U.S. standards.

The Psyllium husk used in this invention is whole, fragmented, slitted, normal, bleached, snow white or processed source of psyllium husk powder. Specifications of psyllium husk powder are as below.

The development of gluten is essential to accommodate the gases produced by the leavening agents. Hence an appropriate amount of additional water is required to bind the dough without lumps, make it remain intact and allow the development of gluten.

If higher amount of additional water is used then the dough becomes over hydrated. Dough products wherein leavening agents are used do not raise well, has dense crumb and are unpalatable. If lower amount of additional water is used then dough product becomes dry and does not remain intact and has poorly developed gluten. As per this invention the right quantity of additional water to bind dough having psyllium is 4.5 gm±20% (i.e. 3.6-5.4 gm) per gram of psyllium added, depending upon the climatic condition, strength of the flour and related parameters. Because of this specific amount of water, dough can bind easily, remain intact and proper development of gluten can be achieved.

Particle Size of Psyllium Husk Powder

Psyllium husk powder is available in various particle sizes (30 to 300 mesh size). Dough products wherein leavening agents are used do not rise well and has dense crumb structure on using too smaller or too bigger particle size. To overcome these problems, as per this invention the particle size of psyllium husk for incorporation into dough products wherein leavening agents are used may preferably range from whole psyllium husk or fragmented psyllium husk or slitted psyllium husk to 300 mesh, more preferably range from 60 to 150 mesh and most preferably range from 80 to 120 mesh.

Use of smaller particle size psyllium husk in dough products wherein leavening agents are not used, makes the dough more elastic, preventing the processing of dough like rolling Indian breads, extruding pastas and noodles, etc. To overcome these problems, as per this invention the particle size of psyllium husk for incorporation into dough products wherein leavening agents are not used may preferably range from whole psyllium husk or fragmented psyllium husk or slitted psyllium husk to 300 mesh, more preferably range from 20 to 80 mesh and most preferably range from 30 to 50 mesh.

Due to the mucilaginous nature of psyllium, dough products acquire slimy or adhesive texture and poor mouthfeel if excessive psyllium husk is incorporated in the dough product. As per this invention psyllium husk can be incorporated up to

| | | | |
|---|---|---|---|
| Purity of Psyllium Husk Powder | 99% pure | 98% pure | 95% pure |
| Description | Pale Buff, Odourless Husk Powder | Pale Buff, Odourless Husk Powder | Pale Buff, Odourless Husk Powder |
| Psyllium Mucilloid Content | 99% | 98% | 95% |
| Taste | Bland Mucilaginous | Bland Mucilaginous | Bland Mucilaginous |
| Moisture | 10% Max | 10% Max | 10% Max |
| Swell Volume | Min 50 ml/Gram | Min 45 ml/Gram | Min 40 ml/Gram |
| Total Ash | 4% Max | 4% Max | 4% Max |
| Acid Insoluble Ash | 1.0% Max | 1.0% Max | 1.0% Max |
| Heavy Extraneous Matter | 0.3% Max | 0.4% Max | 0.5% Max |
| Light Extraneous Matter | 1.0% Max | 2.0% Max | 5.0% Max |
| Mesh Size Limit | Min 95% pass through the specified mesh size | Min 95% pass through the specified mesh size | Min 95% pass through the specified mesh size |

Additional Water to Bind the Dough Containing Psyllium Husk

Psyllium husk absorbs water instantly to form a gelatinous mass causing formation of lumps in the dough, not allowing the dough to remain intact and preventing the development of gluten in dough products wherein leavening agents are used.

8% of the flour ingredient into dough products using the amount of additional water and the proper size of the psyllium husk particles mentioned previously in this invention.

Effects of Adding Gluten Flour

Addition of gluten flour provides extra strength to the dough products wherein leavening agents are used which, can also help in incorporation of higher amount of psyllium husk. In the present invention addition of gluten flour up to 2% of the flour ingredient can increase psyllium husk incorporation up to 14% of the flour ingredient.

Although the invention has been described with reference to use of psyllium husk, it is not meant to be construed in a limiting sense. In the present invention psyllium seed can also be used. Using psyllium husk powder having purity below 95% e.g. psyllium seed powder, 70% pure or 85% pure psyllium husk powder does not adversely affect the incorporation except that it yields a grayish brown colour to brown colour. Various purity of psyllium husk powder is available. As per this invention psyllium husk powder having purity above 95% produces dough products which are equally at par with dough products without psyllium in terms of colour, taste, aroma, etc. Bleached and Snow White Psyllium husk powder can also be used to further improve the colour of the dough products.

However, apart from the therapeutic advantages of psyllium, a low purity i.e. psyllium husk powder having purity below 95% can be used to impart brownish colour to food products.

Embodiment of the present invention relates process for preparing dough products, which involves following steps:

(1) Dry psyllium husk is blended with the flour during making of a dough product or psyllium is added to the grains during grinding of the grains or mixed with flour at any suitable stage of manufacture of flour.
(2) Remaining ingredients are added and mixed well.
(3) Water and additional water for psyllium husk is added.
(4) Dough is prepared.
(5) Processing the dough further depending upon the dough product required.

The invention is illustrated more in detail in the following examples. The examples describe and demonstrate embodiments within the scope of the present invention. These examples are given solely for the purpose of illustration and are not to be construed as limitations of the present invention, as many variations thereof are possible without departing from the spirit and scope.

EXAMPLES

Example 1

Prepare a reference white bread
Ingredients

| Ingredient Name | Weight (Grams) |
|---|---|
| Flour | 164 |
| Water | 106.6 |
| Salt | 2.4 |
| Sugar | 6.5 |
| Yeast | 3.3 |
| Oil | 4.5 |

Method
1. Activate yeast in little warm water and adequate sugar. Use yeast, water and sugar from the measured ingredients.
2. Once the yeast has activated, mix all the ingredients except oil and bind the dough. Knead the dough until it does not stick to the wall of the utensil and the surface of the dough also appears smooth.
3. Add oil to the dough and again knead the dough until oil disappears.
4. Make a nice round hemi-spherical shape and cover the dough to ferment and rise. It would take about 30 to 45 min to rise.
5. The dough is considered to be fermented if by adding a little portion of dough in water, it floats on the surface.

-continued

6. Remove the gases generated during the fermentation process by pressing the dough and make sure that the gases are removed completely. Now give shape to the dough to put it in its mould. Make sure to grease the mould before putting dough into it. Cover the lid of the mould.
7. Put the dough to rise. The dough will rise up to more than 2/3 of the mould. It would take about 30 to 45 mm to rise.
8. Once the dough has rose enough, preheat the oven and then put the mould slowly without any jerks into the oven. Bake for 20 min at 230 degree Celsius.
9. Remove the bread from the oven and grease it with ghee, butter or oil if the mould was not covered with its lid.
10. Slice after two hours.

Result

| Taste | Same as commercial white bread available in market |
|---|---|
| Color | Same as commercial white bread available in market |
| Crumb | Same as commercial white bread available in market |
| Rise (cm) | 9.2 |
| Weight (gm) | 238 |

Example 2

Prepare bread having 5 gm additional water per 1 gm of psyllium husk powder
Ingredients

| Ingredient Name | Weight (Grams) |
|---|---|
| Flour | 130.0 |
| Water | 84.5 |
| Salt | 1.95 |
| Sugar | 5.2 |
| Yeast | 2.6 |
| Oil | 4.5 |
| Psyllium (99% pure, 100 mesh) | 6.5 |
| Additional water for psyllium | 32.5 |

Method
1. Activate yeast in little warm water and adequate sugar. Use yeast, water and sugar from the measured ingredients.
2. Add psyllium husk to flour and mix them well.
3. Once the yeast has activated, mix all the ingredients except oil and bind the dough. Knead the dough until it does not stick to the wall of the utensil and the surface of the dough also appears smooth.
4. Add oil to the dough and again knead the dough until oil disappears.
5. Make a nice round hemi-spherical shape and cover the dough to ferment and rise. It would take about 30 to 45 mm to rise.
6. The dough is considered to be fermented if by adding a little portion of dough in water, it floats on the surface.
7. Remove the gases generated during the fermentation process by pressing the dough and make sure that the gases are removed completely. Now give shape to the dough to put it in its mould. Make sure to grease the mould before putting dough into it. Cover the lid of the mould.
8. Put the dough to rise. The dough will rise up to more than 2/3 of the mould. It would take about 30 to 45 min to rise.
9. Once the dough has rose enough, preheat the oven and then put the mould slowly without any jerks into the oven. Bake for 30 min at 230 degree Celsius.
10. Remove the bread from the oven and grease it with ghee, butter or oil if the mould was not covered with its lid.
11. Slice after two hours.

Result

| Taste | Slimy and unpalatable |
|---|---|
| Color | Little darker than white bread |
| Crumb | Dense |

The dough appears little gluey due to the mucilaginous nature of psyllium. And dough is difficult to work with.

Example 3

Prepare bread having 4 gm additional water per 1 gm of psyllium husk powder

Ingredients

| Ingredient Name | Weight (Grams) |
|---|---|
| Flour | 130.0 |
| Water | 84.5 |
| Salt | 1.95 |
| Sugar | 5.2 |
| Yeast | 2.6 |
| Oil | 4.5 |
| Psyllium (99% pure, 100 Mesh) | 6.5 |
| Additional water for psyllium | 26 |

Method

Same as Example 2

Result

| Taste | Gritty and unpalatable |
|---|---|
| Color | Little darker than white bread |
| Crumb | Dense |

Difficulty in binding the dough as it was dry and did not remain intact. The bread did not rise well.

Example 4

Prepare bread having 4.5 gm additional water per gm of psyllium husk powder

Ingredients

| Ingredient Name | Weight (Grams) |
|---|---|
| Flour | 130.0 |
| Water | 84.5 |
| Salt | 1.95 |
| Sugar | 5.2 |
| Yeast | 2.6 |
| Oil | 4.5 |
| Psyllium (99% pure, 100 Mesh) | 6.5 |
| Additional water for psyllium | 29.25 |

Method

Same as Example 2

Result

| Taste | Similar as white bread with better mouthfeel |
|---|---|
| Color | Little darker than white bread |
| Crumb | Same as white bread |

Dough could be bound easily and was consistent.

Preparation of bread having 8% psyllium husk powder with different mesh size, 98% purity

| Ingredients | Example 5 Mesh Size 40 | Example 6 60 | Example 7 80 | Example 8 100 | Example 9 120 | Example 10 150 | Example 11 200 |
|---|---|---|---|---|---|---|---|
| Flour | 130.0 | | | | | | |
| Water | 84.5 | | | | | | |
| Salt | 1.95 | | | | | | |
| Sugar | 5.2 | | | | | | |
| Yeast | 2.6 | | | | | | |
| Oil | 4.5 | | | | | | |
| Psyllium Husk | 10.4 | | | | | | |
| Additional water for psyllium husk | 46.8 | | | | | | |
| Method | Same as Example 2 | | | | | | |
| Results | | | | | | | |
| Taste | Similar as white bread with better mouthfeel | | | | | | |
| Colour | Darker than white bread | | | | | | |
| Crumb | Denser than white bread | Denser than white bread | Little denser than white bread | Same as white bread | Little denser than white bread | Denser than white bread | Denser than white bread |
| Rise (cm) | 7.9 | 7.9 | 9.0 | 9.5 | 8.6 | 9.3 | 8.9 |
| Weight (gm) | 228.7 | 229.4 | 232.05 | 229.15 | 220.30 | 223.35 | 221.75 |
| Comment | No detectable odour of psyllium | | | | | | |

Preparation of bread having different amount of incorporation of 100 mesh size, 96% pure psyllium husk powder and gluten flour

| Ingredients | Example 12 | Example 13 | Example 14 | Example 15 | Example 16 | Example 17 |
|---|---|---|---|---|---|---|
| Psyllium Husk incorporation | 9% | 10% | 11% | 12% | 13% | 14% |
| Flour | 130.0 | | | | | |
| Gluten Flour | 1.3 | | | | | |

-continued

| | | | | | | |
|---|---|---|---|---|---|---|
| Water | 84.5 | | | | | |
| Salt | 1.95 | | | | | |
| Sugar | 5.2 | | | | | |
| Yeast | 2.6 | | | | | |
| Oil | 4.5 | | | | | |
| Psyllium husk | 11.7 | 13.0 | 14.3 | 15.6 | 16.9 | 18.2 |
| Additional water for psyllium husk | 52.65 | 58.50 | 64.35 | 70.2 | 76.05 | 81.9 |
| Method | Same as Example 2 | | | | | |
| Results | | | | | | |
| Taste | Similar as white bread with better mouthfeel | | | | | |
| Colour | Little darker than white bread | | | | | |
| Crumb | Same as white bread | | | | | |
| Rise (cm) | 9.0 | 9.7 | 9.7 | 9.7 | 9.8 | 10 |
| Weight (gm) | 227.5 | 241.8 | 235.1 | 248.7 | 253.85 | 257.3 |
| Comment | No detectable odour of psyllium | | | | | |

Preparation of bread having 8% psyllium husk powder with different purity and 100 mesh size

| Ingredients | Example 18 Purity of Psyllium Husk 95% Pure | Example 19 85% Pure | Example 20 70% Pure |
|---|---|---|---|
| Flour | 130.0 | | |
| Water | 84.5 | | |
| Salt | 1.95 | | |
| Sugar | 5.2 | | |
| Yeast | 2.6 | | |
| Oil | 4.5 | | |
| Psyllium husk | 10.4 | | |
| Additional water for psyllium husk | 46.8 | | |
| Method | Same as Example 2 | | |
| Results | | | |
| Taste | Similar as white bread with better mouthfeel | | |
| Colour | Little darker than white bread | Brown | Dark brown |
| Crumb | Same as white bread | Dense | Dense |
| Rise (cm) | 9.4 | 8.4 | 6.0 |
| Weight (gm) | 227.0 | 208.9 | 208.0 |
| Comment | No detectable odour of psyllium check again | | |

Example 21

| | |
|---|---|
| Prepare bread having 8% psyllium seed powder of 40 mesh | |
| Ingredients | |
| Ingredient Name | Weight (Grams) |
| Flour | 130.0 |
| Water | 84.5 |
| Salt | 1.95 |
| Sugar | 5.2 |
| Yeast | 2.6 |
| Oil | 4.5 |
| Psyllium seed powder (40 Mesh) | 10.4 |
| Additional water for psyllium | 15.5 |
| Method | |
| Same as Example 2 | |
| Result | |
| Taste | Similar to white bread |
| Color | Brown |
| Crumb | Dense |
| Rise (cm) | 7.0 |
| Weight (gm) | 210.35 |
| Aroma | No detectable odour of psyllium |

Preparation of bread having 8% psyllium husk powder with 99% pure, 100 mesh size Bleached and Snow White psyllium husk powder

| Ingredients | Example 22 Type of 99% pure, 100 mesh size psyllium husk powder Bleached | Example 23 Snow white |
|---|---|---|
| Flour | 130.0 | |
| Water | 84.5 | |
| Salt | 1.95 | |
| Sugar | 5.2 | |
| Yeast | 2.6 | |
| Oil | 4.5 | |
| Psyllium husk | 10.4 | |
| Additional water for psyllium husk | 46.8 | |
| Method | Same as Example 2 | |
| Results | | |
| Taste | Similar as white bread with better mouthfeel | |
| Colour | Same as white bread | Same as white bread |
| Crumb | Same as white bread | Same as white bread |
| Rise (cm) | 9 | 10.1 |
| Weight (gm) | 230 | 231.85 |

| Ingredients | Example 24 Type of psyllium husk powder Whole Wheat Bread with 8%, 100 mesh, 99% pure psyllium husk powder | Example 25 Whole Wheat Bread |
|---|---|---|
| Flour | 39 | 48 |
| Whole Wheat Flour | 91 | 115 |
| Water | 84.5 | 106 |
| Salt | 1.95 | 2.4 |
| Sugar | 5.2 | 6.5 |
| Yeast | 2.6 | 3.3 |
| Oil | 4.5 | 4.5 |
| Psyllium husk | 10.4 | |
| Additional water for psyllium husk | 46.8 | |
| Method | Same as Example 2 | |
| Results | | |
| Taste | Softer & moist than whole wheat bread with better mouthfeel. | Same as commercial whole wheat bread available in market |
| Colour | Darker than whole wheat bread | Same as commercial whole wheat bread available in market |

-continued

| | | |
|---|---|---|
| Crumb | Same as whole wheat bread | |
| Rise (cm) | 7.3 | 7.1 |
| Weight (gm) | 240.35 | 246.6 |

Example 26

Prepare Indian roti having 8% of 40 mesh, 98% pure Psyllium Husk Powder
Ingredients

| Ingredient Name | Weight (Grams) |
|---|---|
| Whole Wheat Flour | 40 |
| Water | 32 |
| Psyllium Husk Powder (40 Mesh, 98% pure) | 3 |
| Additional water for psyllium husk | 15 |

Method
1. Take flour and mix Psyllium husk to it well for Psyllium enriched roti.
2. Add water to it and bind the dough well.
3. Now make several small round parts of the dough.
4. Roll each round part and then bake the roti from both sides on a pan on gas stove.
5. Grease the roti with ghee/butter(optional).
6. Serve hot.
Result

| | |
|---|---|
| Taste | Softer & moist with better mouthfeel than plain roti even after 12 hours |
| Color | Similar to plain roti |
| Weight (gm) | 72.20 gm |
| Moisture | 40% |
| | The moisture is 10% higher than roti without psyllium and is retained even after 12 hours. |

Example 27

Prepare naan having 8% of 40 mesh, 98% pure Psyllium Husk
Ingredients

| Ingredient Name | Weight (Grams) |
|---|---|
| Wheat Flour | 204.80 |
| Water | 150 |
| Psyllium Husk Powder (40 Mesh, 98% pure) | 16.4 |
| Additional water for psyllium husk | 82 |

Method
1. Take flour and add psyllium husk to it and mix well.
2. Now add water to it and bind the dough well.
3. Divide the dough into several round parts.
4. Roll the round parts by hand and bake it in Tandoor.
5. Grease will ghee/butter.
6. Serve hot.
Result

| | |
|---|---|
| Taste | Similar to plain naan |
| Color | Similar to plain naan |
| Weight (gm) | 267.5 |
| Moisture | 17% |
| | The moisture is 5-6% higher than naan without psyllium and is retained even after 2 hours. |

Example 28

Prepare puri having 8% of 40 mesh, 98% pure Psyllium Husk
Ingredients

| Ingredient Name | Weight (Grams) |
|---|---|
| Whole Wheat Flour | 40 |
| Water | 23.55 |
| Psyllium Husk Powder (40 Mesh, 98% pure) | 3.2 |
| Oil | 4 |
| Additional water for psyllium husk | 14.4 |
| Oil for frying | |

Method
Take flour and add Psyllium Husk powder to it well.
Now add oil to it and mix well.
Add water to it and bind the dough well.
Now divide the dough into small round parts.
Roll the round parts and fry them in hot oil.
Serve hot.
Result

| | |
|---|---|
| Taste | Similar to plain puri |
| Color | Similar to plain puri |
| Weight (gm) | 81.05 |
| Moisture | 46.69% |
| | The moisture is 5% higher than puri without psyllium and is retained as fresh comparatively even after 12 hours. |

Example 29

Prepare khakhra having 8% of 40 mesh, 98% pure Psyllium Husk
Ingredients

| Ingredient Name | Weight (Grams) |
|---|---|
| Whole Wheat Flour | 40 |
| Water | 32 |
| Psyllium Husk Powder (40 Mesh, 98% pure) | 3.2 |
| Additional water for psyllium husk | 15 |

Method
1. Take flour and add psyllium husk powder to it and mix well
2. Add water to it and bind the dough well.
3. Now divide the dough into small round parts.
4. Roll the small parts and roast it on a pan.
5. Serve when cools.
Result

| | |
|---|---|
| Taste | Similar to plain khakhra with better mouthfeel. |
| Color | Similar to plain khakhra |
| Weight (gm) | 52.25 |
| Moisture | 0.17% |
| | The moisture is just 0.09% higher than khakhra without psyllium. |

Example 30

Prepare noodles having 8% of 40 mesh, 98% pure Psyllium Husk
Ingredients

| Ingredient Name | Weight (Grams) |
|---|---|
| Wheat Flour | 250 |
| Water | 200 |
| Psyllium Husk Powder (40 Mesh, 98% pure) | 20 |

| | |
|---|---|
| Additional water for psyllium husk | 90 |

Method
1. Take flour and add psyllium husk powder to it and mix well
2. Add water to it and bind the dough well.
3. Now put the dough into noodle extracting machine and extract the noodles.
4. Dry the noodles and store.
5. For preparing a dish, boil noodles and then drain the excess water, now process noodles as required.

| | |
|---|---|
| Result | |
| Taste | Similar to plain noodles |
| Color | Similar to plain noodles |

Note:
The extracting and boiling of noodles is similar to plain noodles.

We claim:

1. A method of preparation of psyllium incorporated dough products comprising the steps of:
   (a) mixing psyllium with a flour during making of a dough product, wherein the psyllium having 10% or less moisture, particle size from whole psyllium up to 300 mesh size particles 95% to 99.99% purity and quantity up to 14% of total amount of flour;
   (b) adding water and additional 3.6 to 5.4 gm water per gram of psyllium to the mixture prepared in step (a);
   (c) binding the dough by adding oil and kneading the mixture prepared in step (b);
   (d) cooking the dough product by at least one of the following:
   heating;
   baking;
   roasting;
   drying;
   frying.

2. The method of preparation of psyllium incorporated dough products as claimed in claim 1 wherein optionally salt, sugar, fat and leavening agent are added to the mixture prepared in step (a).

* * * * *